Jan. 19, 1954
J. DIM ET AL
2,666,354
SEALING ASSEMBLY
Filed June 1, 1950
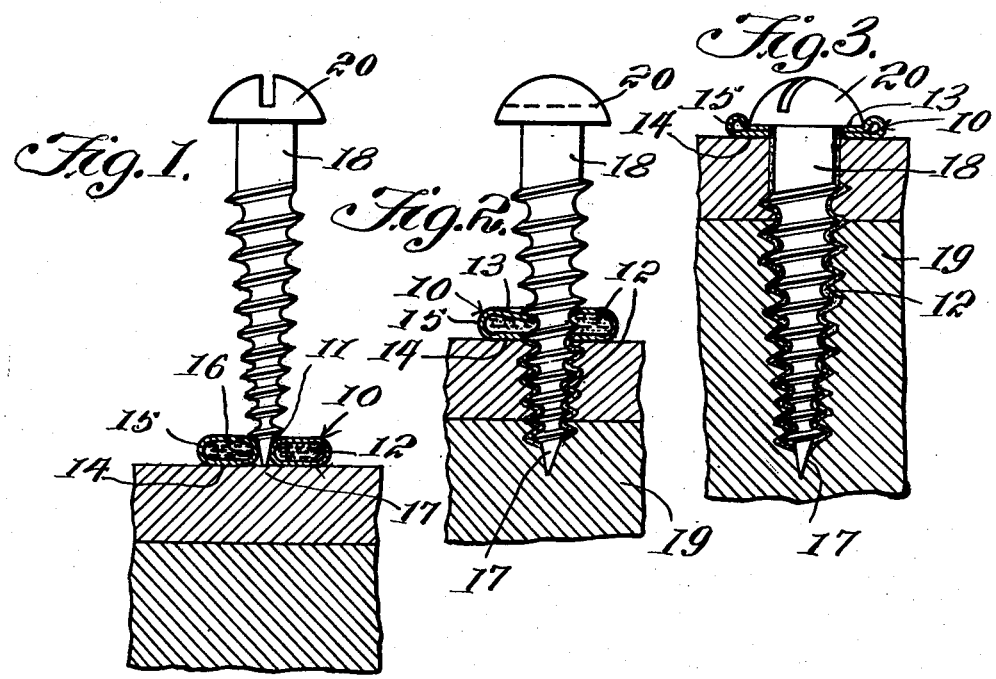
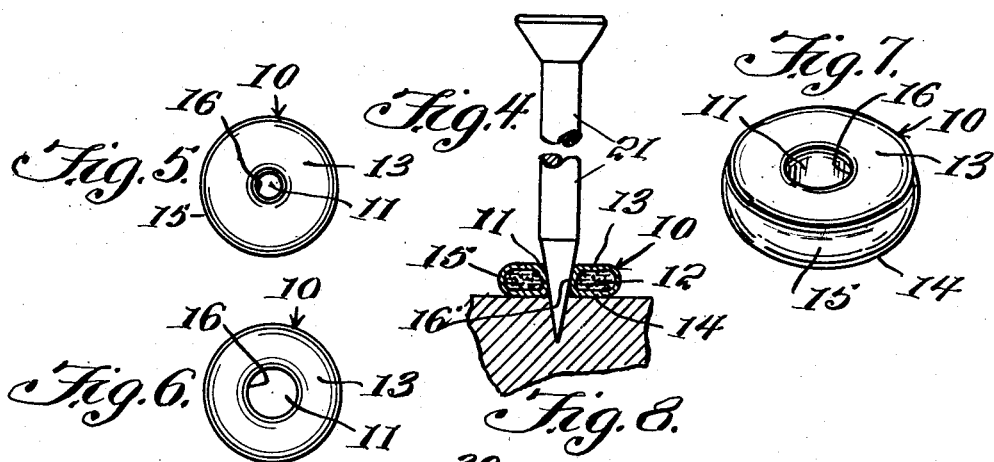
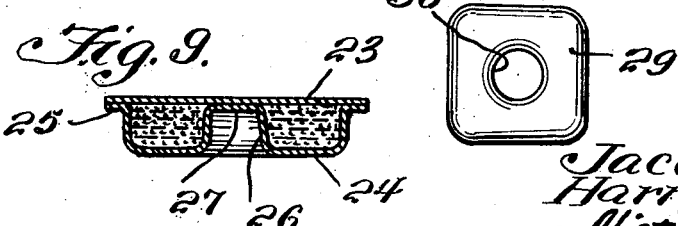
INVENTOR.
Jacob Dim,
Harry Berg,
BY Victor J. Evans & Co.
ATTORNEYS Patented Jan. 19, 1954

2,666,354

UNITED STATES PATENT OFFICE 2,666,354

SEALING ASSEMBLY

Jacob Dim and Harry Berg, St. Paul, Minn.

Application June 1, 1950, Serial No. 165,438

1 Claim. (Cl. 85—1)

This invention relates to sealing devices particularly of the type placed around screws, bolts, nails and the like, and in particular a washer having a sealed open area therein in which glue or other adhesive is contained.

The purpose of this invention is to provide means for sealing an opening around the head of a screw, bolt, nail or the like wherein a sealing material, such as glue is released as a screw is actuated into material whereby the glue flows around the threads or outer surface of a fastening element providing a bind and seal between the element and the surrounding material.

Various attempts have been made to provide soft metal washers, rubber gaskets and other sealing elements under the heads of screws and the like but devices of this type are readily broken by the pressure of the screw and, particularly where rubber washers or gaskets are used, these may work out of their sealing positions under the head so that the seal will be broken. With this thought in mind this invention contemplates a sealing washer in the form of a capsule in which sealing material is contained and as the fastening element is inserted the sealing material is released to form a positive bind around the head and shank of the fastening elements.

The object of this invention is, therefore, to provide a sealing element in which a sealing material may be contained wherein the material is released as the device is used.

Another object of the invention is to provide a sealing element for use in combination with screws, bolts, nails and the like that may be used without changing the design or construction of the fastening element with which it is used.

A further object of the invention is to provide a sealing element having a releasable binding or sealing material therein which is of a simple and economical construction.

With these and other objects and advantages in view the invention embodies a washer in the form of a life saver or doughnut having glue or other sealing material sealed in the inner open area thereof.

Other features and advantages of the invention will appear from the following description taken in connection with the drawings wherein:

Figure 1 is a cross section through the sealing washer showing the washer positioned on the end of a screw with the screw in the position of entering blocks of wood or other materials.

Figure 2 is a similar view showing the screw partly inserted through the sealing washer.

Figure 3 is a similar view showing the screw inserted in the material with the sealing material forced from the washer and deposited into the area around the screw.

Figure 4 is a view similar to that shown in Figure 1 showing a nail in combination with the sealing washer instead of the screw.

Figure 5 is a plan view showing a circular washer with an opening through the center thereof.

Figure 6 is a similar view looking toward the under side of the washer showing a centrally disposed recess in the washer with the upper surface closed.

Figure 7 is a view illustrating the washer with the recess in the upper surface thereof.

Figure 8 is a detail illustrating a modification wherein the washer is provided with flat sides.

Figure 9 is a cross section through the sealing washer of the type shown in Figures 6 and 7 illustrating the modification wherein a washer is provided with a continuous upper surface and a recess is provided in the center of the lower surface.

Referring now to the drawings wherein like reference characters denote corresponding parts the sealing washer of this invention includes a hollow body 10 having an opening 11 through the center and having glue or other sealing fluid as indicated by the numeral 12 therein.

In the design shown in Figure 1 the washer is formed with an upper circular panel 13 and a lower similar panel 14 and the panels are connected by an annular arcuate wall 15 positioned at the outer edge of the washer, and a similar wall 16 positioned around the opening 11.

With the parts formed in this manner the point 17, of a screw 18 is inserted through the opening 11 of the washer and as the screw is actuated into the material, as indicated by the numeral 19 the threads of the screw cut the inner wall 16 of the washer, thereby releasing the glue, or other material whereby the glue travels along the threads providing a bind between the fastening element and material and when the screw is all of the way in the washer is flattened by the head 20 thereof, as shown in Figure 3 whereby the material of the washer provides a sealing element or gasket that facilitates sealing the fastener in addition to the glue or other adhesive material.

In Figure 4 a washer, as indicated by the numeral 10, is positioned around the point of a nail 21 or the like and as the nail is driven into material, as indicated by the numeral 22 the washer is broken and the sealing material therein seals the opening around the nail, pin or the like.

In the design shown in Figures 6 and 9 the sealing washer is formed with an upper disc 23 and a lower element 24 having a peripheral flange 25 by which it is secured to the edge of the disc 23, and an inner cup-shape element 26, the inner ends 27 of which are positioned against the inner surface of the disc 23 and as a nail, screw, or other fastening element is forced through the center of this washer the wall of the cup-shape element 26 is broken whereby the glue or other material is released and the material flows around the fastening element in a manner similar to that shown in Figures 1, 2 and 3.

In the design shown in Figure 8 a hollow body 29 is provided with a centrally disposed opening 30 and glue or other adhesive material, positioned in the hollow body 29 is released as a fastener is forced through the opening 30.

It will be understood, therefore, that the sealing washer may be of any shape, and may also be of any size or design.

It will also be understood that although glue is referred to as a sealing agent, any suitable adhesive or other material may be used.

It will be understood that other modifications may be made in the design and arrangement of the parts without departing from the spirit of the invention.

What is claimed is:

In a sealing assembly, the combination which comprises a fastening element having a shank with a tapered end, and a flat hollow body of frangible material having liquid glue therein and having a central opening of less area than the cross section of said shank through which the end of said shank extends whereby upon passage of the shank through the body the liquid therein flows around the fastening element providing a seal between the fastening element and material in which the fastening element is positioned.

JACOB DIM.
HARRY BERG.

References Cited in the file of this patent

UNITED STATES PATENTS

| Number | Name | Date |
|---|---|---|
| 907,136 | Farrington et al. | Dec. 22, 1908 |
| 943,019 | Huhn | Dec. 14, 1909 |
| 1,131,925 | Gervais | Mar. 16, 1915 |
| 1,293,615 | Mitchell et al. | Feb. 4, 1919 |
| 1,814,502 | Barwood | July 14, 1931 |
| 1,931,922 | Damsel et al. | Oct. 24, 1933 |
| 2,001,290 | Thompson | May 14, 1935 |
| 2,451,194 | Braun | Oct. 12, 1948 |

FOREIGN PATENTS

| Number | Country | Date |
|---|---|---|
| 442,832 | Great Britain | Feb. 17, 1936 |
| 151,225 | Great Britain | of 1920 |
| 168,094 | Great Britain | of 1921 |
| 283,095 | Great Britain | of 1928 |
| 567,011 | Germany | Dec. 24, 1932 |
| 697,683 | Germany | Oct. 19, 1940 |